United States Patent [19]

Izumi et al.

[11] Patent Number: 4,985,502

[45] Date of Patent: Jan. 15, 1991

[54] THERMOPLASTIC ELASTOMER

[75] Inventors: Zenichiro Izumi; Shigeru Kurosawa; Rika Akiyoshi, all of Oita, Japan

[73] Assignee: Showa Denko K.K., Tokyo, Japan

[21] Appl. No.: 455,016

[22] Filed: Dec. 22, 1989

[30] Foreign Application Priority Data

Dec. 23, 1988 [JP] Japan .................. 63-327482
Aug. 2, 1989 [JP] Japan .................. 1-200884

[51] Int. Cl.$^5$ .............. C08L 23/26; C08L 23/16; C08L 23/04; C08L 23/10
[52] U.S. Cl. ................... 525/194; 525/240; 525/211; 525/193; 525/88; 525/97; 524/528
[58] Field of Search ..................... 525/240, 194

[56] References Cited

U.S. PATENT DOCUMENTS

| | | | |
|---|---|---|---|
| 3,806,558 | 4/1974 | Fischer | 525/211 |
| 4,104,210 | 8/1978 | Coran et al. | 260/4 |
| 4,130,535 | 12/1978 | Coran et al. | 525/211 |
| 4,311,628 | 1/1982 | Sabet et al. | 525/232 |
| 4,822,855 | 4/1989 | Kobayashi et al. | 525/194 |

*Primary Examiner*—Carman J. Seccuro
*Attorney, Agent, or Firm*—Armstrong, Nikaido, Marmelstein, Kubovcik & Murray

[57] ABSTRACT

A thermoplastic elastomer with well-balanced physical properties is prepared by treating a rubber/resin composition comprised of (a) 45–90 wt. parts of a rubbery component and (b) 10–55 wt. parts of a polyolefin resin, with a curing agent. The rubbery component (a) is comprised of 5–100 wt. % of an ethylene-propylene copolymer rubber having an ethylene content of 60–78 mole %, a crystallinity of 4 to 20%, a maximum peak temperature of melting of at least 100° C., an MFI of less than 0.01 at 230° C., an HLMFI/MFI of at least 35, an Mw/Mn of at least 4, and a tensile strength at break of at least 100 kg/cm$^2$, and 95–0% by weight of an ethylene-propylene-nonconjugated diene copolymer. The rubbery component in the cured product has a gel content more than 80 wt. % and less than 97 wt. % as determined by immersion in cyclohexane at 23° C. for 48 hours.

9 Claims, No Drawings

THERMOPLASTIC ELASTOMER

BACKGROUND OF THE INVENTION

1. Field of the Invention

This invention relates to a thermoplastic elastomer, more particularly a thermoplastic elastomer having a high strength and an excellent fluidity, flexibility, oil resistance, and rubber elasticity.

Thermoplastic elastomers now can be processed by the same methods as used for processing thermoplastic resins, for example, injection molding, blow molding, rotational molding, and extrusion molding, and various compositions having a required rubber-like flexibility are commercially available and have been utilized for various purposes which require a good processability and easy recycle use, compared with crosslinked rubbers of the prior art.

The thermoplastic elastomer has a molecular design, containing in a polymer system soft segments exhibiting rubbery properties at the use temperature thereof and hard segments such as crystal, glass, etc., which can be regarded as pseudo-crosslinks, behaving in the same way as a crosslinked rubber at the use temperature thereof and exhibiting a similar behavior to general thermoplastic resins at the processing temperature.

Among various thermoplastic elastomers, polyolefin elastomers are primarily used in the fields of automobiles and cables due to their superior weatherability and heat resistance.

2. Description of the Related Art

An olefinic thermoplastic elastomeric composition comprising a blend of a partially crosslinked monoolefin copolymer rubber and a polyolefin resin is disclosed in Japanese Patent Publication (Kokoku) No. 53-34210, among others. This composition, although having an excellent flexibility and fluidity, has a low strength and poor rubber elasticity, compared with vulcanized rubber. As an elastomer composition in which these drawbacks have been eliminated, there is known an olefinic thermoplastic elastomer composition comprising a blend of a completely crosslinked ethylene-propylene-nonconjugated diene rubber (EPDM) and a polyolefin resin, as disclosed in Japanese Patent Publication (Kokoku) No. 55-18448, among others. This composition, however, has an inferior fluidity, although having performances comparable with those of vulcanized rubber, and there is still a need for an improvement thereof.

The major cause of a lowering of other characteristics when one drawback is eliminated, is considered due to the fact that the rubber component used is an amorphous and random copolymer, and further, is an EPDM with a narrow molecular weight distribution containing unsaturated groups. Such a copolymer rubber, although flexible, has a very low strength, and crosslinking is required for an enhancement of this strength.

Nevertheless, although the heat resistance and compression permanent set, etc., can be improved by a partial crosslinking with, for example, an organic peroxide, there is relative little improvement in the tensile strength, and accordingly, as the amount of rubber component is increased, a complete crosslinking is required to maintain the strength, but this markedly lowers the fluidity.

As a means for avoiding a lowering of the fluidity, a mineral oil type softening agent has been added in a great amount, but this results in undesirable effects such as an increased kneading time when adding the oil, a lower strength, and bleeding, etc.

A crosslinked resin composition using a crystalline ethylene-α-olefin is disclosed in Japanese Unexamined Patent Publication (Kokai) No. 61-152753, but since the molecular weight of the crystalline ethylene-α-olefin used is as relatively low as 0.01 to 100 g/10 min. in terms of the melt index at 190° C., the green strength as a soft rubber component is low, and further the crosslinking characteristic is poor for the same reason. Consequently, this has proved to be unsatisfactory when trying to obtain a composition with a well-balanced flexibility, strength, and rubber elasticity.

SUMMARY OF THE INVENTION

An object of the present invention is to provide a thermoplastic elastomer composition with well-balanced physical properties and having a high fluidity not obtainable in the prior art, and further having an excellent strength, flexibility, which is comparable to a vulcanized rubber, rubber elasticity, and oil resistance, by using a specific ethylene-propylene copolymer rubber (EPM) having a crystallinity, or if necessary, a blend thereof with an ethylene-propylene-nonconjugated diene copolymer rubber as the rubber to be blended with a polyolefin resin.

The present inventors made an intensive study of this matter, and as a result, found that the object of the present invention can be accomplished by formulating a saturated ethylene-propylene copolymer rubber (EPM) having a high molecular weight and containing polyethylene crystals therein or, if necessary, a mixture thereof with an ethylene-propylene-nonconjugated diene polymer (EPDM), a polyolefinic resin, and if necessary, a softening agent, and dynamically effecting a heat treatment by using a curing agent to partially crosslink the rubber component, to thereby complete the present invention.

More specifically, in accordance with the present invention, there is provided a thermoplastic elastomer which is a cured product prepared by treating a composition comprising (a) 45 to 90 parts by weight of a rubbery component and (b) 10 to 55 parts by weight of a polyolefin resin, based on 100 parts by weight of the sum of the components (a) and (b), with a curing agent; said rubbery component (a) comprising, based on the weight of the rubbery component, 5 to 100% by weight of an ethylene-propylene copolymer rubber having an ethylene content of 60 to 78% by mole, a crystallinity of 4 to 20% as determined by the X-ray diffractometry, a maximum peak temperature of melting of at least 100° C., a melt flow index (MFI) at 230° C. of less than 0.01, a high-load melt flow index (HLMFI)/melt flow index (MFI) ratio of at least 35, a weight average molecular weight (Mw)/number average molecular weight (Mn) ratio (polydispersed value) of at least 4, and a tensile strength at break of at least 100 kg/cm$^2$, and 95 to 0% by weight of an ethylene-propylene-nonconjugated diene copolymer; and said rubbery component (a) in the cured product having a gel content of more than 80% by weight and less than 97% by weight as determined by immersion in cyclohexane at 23° C. for 48 hours.

DESCRIPTION OF THE PREFERRED EMBODIMENTS

As the ethylene-propylene copolymer rubber (hereinafter abbreviated as EPM) to be used as a part of the component (a) of the present invention, one having the following characteristics may be used.

A tensile strength at break in an uncrosslinked state (green strength) [$\sigma$] of at least 100 kg/cm$^2$, preferably at least 150 kg/cm$^2$, more preferably at least 200 kg/cm$^2$, usually up to about 350 kg/cm$^2$, an ethylene content of 60 to 78% by mole, an Mw/Mn of at least 4, preferably at least 5, usually up to about 8, as measured by GPC (gel permeation chromatography) (where Mw and Mn represent, respectively, the weight average molecular weight and the number average molecular weight), an MFI at 230° C. of less than 0.01, an HLMFI/MFI of at least 35, usually up to about 100, (where HLMFI and MFI represent, respectively, values obtained under loads of 21.6 kg and 2.16 kg as in the method of JIS K7210), a crystallinity of 4 to 20% preferably 4 to 10% as measured by the X-ray diffractometry, and a melting peak [Tm] of the polyethylenic crystals of at least 100° C., usually from 100° C. to about 150° C., as measured by the differential scanning calorimetry (DSC).

The crystal component of the above EPM has a lower melting point to some extent after curing than that before curing, but acts as physical crosslinked sites, and behaves in the same way as the crosslinked sites bonded through a covalent bond, provided that the crystal component exists as a crystal at a temperature not higher than the melting point of the crystal, and apparently has the effect of increasing the crosslinking density, to thereby improve the strength and oil resistance.

On the other hand, at a temperature of about 160° to 170° C. or higher, preferably 180° to 230° C., which is the molding processing temperature higher than the melting temperature of polypropylene, the physical crosslinked sites are lost due to the melting of the polyethylene crystals in the EPM, whereby the total crosslinking density is lowered and thus the required flowability can be maintained.

Accordingly, in an EPM having a crystallinity of less than 4%, the strength will be lowered due to a shortage of the physical crosslinked sites of the elastomer, and at a crystallinity exceeding 20%, the EPM is too hard and the resulting elastomer has little flexibility.

The ethylene content in the EPM is from 60 to 78% by mole. If less than 60%, the green strength is too low, and if more than 78% by mole, it becomes too hard and lacks flexibility. As represented by Shore A, this hardness corresponds substantially to 50 to 95. Preferably, the Shore A is 60 to 80.

The green strength of EPM is dependent not only on the polyethylene crystallinity but also on the molecular weight. The more flexible the EPM, namely the smaller the polyethylenic crystallinity, the higher molecular weight the EPM must have to obtain a high strength. More specifically, to obtain a green tensile strength of at least 100 kg/cm$^2$, the EPM must have an MFI at 230° C. of less than 0.01.

Another advantage of making the MFI less than 0.01 is to provide a better gelation efficiency during the crosslinking, whereby only a small amount of the crosslinking agent in the organic peroxide crosslinking need be used, and the entanglements advantageous to the rubber elasticity can be increased, to reduce the number of molecular chain ends as possible defects.

To obtain a good fluidity, the polydispersed value Mw/Mn as measured by GPC must be at least 4, preferably at least 5, and the HLMFI/MFI measured at 230° C. must be at least 35. By thus making the molecular weight distribution broader, compared with the EPM of the prior art, a thermoplastic elastomer composition having an excellent fluidity even after crosslinking can be obtained.

The EPM having the above characteristics gives an excellent performance as a thermoplastic elastomer, because it has been made to have soft segments comprising an ethylene-propylene random copolymer and hard segments comprising an ethylenic crystal arranged within the same molecule, and therefore, has a well-balanced strength and flexibility.

As a typical process for preparing the EPM giving such a performance, the process disclosed in Japanese Unexamined Patent Publication (Kokai) No. 57-179207 may be mentioned. According to that process, a copolymer rubber suitable for the present invention can be made by copolymerizing ethylene and propylene as a slurry at a reaction temperature of 50° C. or lower in a saturated or unsaturated hydrocarbon with 4 or less carbon atoms in the presence of a Ziegler type catalyst. According to this preparation process, due to the preparation as a slurry different from the solution polymerization process of the prior art, it is possible to easily obtain a copolymer rubber containing polyethylene crystal components having a high melting point. Further, the copolymer rubber can be easily given a higher molecular weight, which is advantageous to the crosslinking and an increased strength.

As the catalyst system suitable for such a process, there may be included catalyst systems comprising (a) a solid component containing titanium, chlorine, and optionally, magnesium, (b) an organic aluminum compound such as trialkylaluminum, and (c) optioanlly, a third component, as disclosed in Japanese Unexamined Patent Publications (Kokai) Nos. 47-34478, 51-28189, 52-151691, and 56-11909, or catalyst systems comprising (a) a solid component of a compound containing at least Ti, Mg, and halogen, treated with a cyclic compound containing chlorine or nitrogen, or with this cyclic compound together with an organic aluminum compound, (b) an organic aluminum compound, and (c) optionally, a cyclic compound containing oxygen, as disclosed in Japanese Unexamined Patent Publications (Kokai) Nos. 56-151707, 57-141410, 58-45209, and 59-215304.

Preferably, the catalyst systems disclosed in Japanese Unexamined Patent Publication (Kokai) Nos. 56-151707 and 59-215304 are employed; more preferably, the catalyst system proposed in Publication No. 59-215304.

Nevertheless, although the above-mentioned EPM gives an excellent performance as the starting material for the thermoplastic elastomer, if the above EPM is used alone as the rubber component in the composition the strength and oil resistance may be excellent but flexibility may be poor. In this case, by blending an ethylene-propylene-nonconjugated diene copolymer rubber (hereinafter abbreviated as EPDM) having a flexibility, as the rubber component, a thermoplastic elastomer having an excellent fluidity well balanced with strength, oil resistance, flexibility, and rubber elasticity can be obtained.

As the EPDM, amorphous ethylene-propylene-diene copolymer rubbers obtained by known methods may be used. As the diene monomer to be used in the EPDM, there may be included nonconjugated dienes with 5 to 20 carbon atoms such as 1,4-pentadiene, 1,4- and 1,5-hexadiene, 2,5-dimethyl-1,5-hexadiene, and 1,4-octadiene, cyclic dienes such as cyclopentadiene, cyclohexadiene, cyclooctadiene, and dicyclopentadiene, and alkenyl norbornenes such as 5-ethylidene- and 5-butylidene-2-norbornene, and 2-methallyl- and 2-iropropenyl-5-norbornene. Among the above, ethylidene norbornene and dicyclopentadiene are preferred.

The ratio of ethylene to propylene is such that the in the EPDM the ethylene content is 60 to 78% by mole, and the amount of the diene monomer is 1 to 15% by weight, preferably 1 to 10% by weight, based on the weight of the EPDM. The EPDM has an intrinsic viscosity $[\eta]$ of 0.5 to 4 dl/g, preferably 1 to 3 dl/g, as measured in decalin at 135° C.

The ratio of EPM to EPDM is in the range of 100/0 to 5/95, preferably 75/25 to 25/75, more preferably 70/30 to 40/60. When the proportion of EPM is larger, the strength becomes higher with good fluidity, while the hardness becomes slightly higher. On the other hand, when the proportion of EPDM is higher, the permanent elongation becomes lower and the elastomer becomes more flexible.

As the polyolefin resin constituting the component (b) of the present invention, one or more kinds of crystalline, high molecular weight solid products obtained by polymerizing one or more kinds of monoolefins by either the high pressure, medium pressure or low pressure polymerization process. Examples of satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Preferably, a polypropylene type resin is used. By the term "polypropylene type resin" used herein is meant (i) an isotactic homopolypropylene, (ii) a random or block copolymer of propylene with an α-olefin such as ethylene, butene-1 or hexene-1, wherein the crystalline component is comprised of polypropylene, and (iii) a blend of the homopolypropylene and/or the propylene copolymer with another polyolefin.

The polypropylene type resin contributes to an improvement of the heat resistance, mechanical strength, and fluidity of the thermoplastic elastomer, and accordingly, preferably has a melting point (the maximum peak temperature of melting) of at least 155° C., as measured by the differential scanning calorimetry (DSC), and a melt flow index at 230° C. of at least 0.01.

The amounts of the component (a) and the component (b) are 45 to 90 parts by weight and 55 to 10 parts by weight, respectively, based on 100 parts by weight of the sum of the component (a) and the component (b). If the amount of the component (a) is less than 45 parts by weight, the thermoplastic elastomer becomes too hard, and if it is more than 90 parts by weight, fluidity is too low although the strength is maintained, and the moldability is poor. If the amount of the component (a) is 75 parts by weight or more, preferably a softening agent is added to improve the flowability.

Also, by using a mixture of homopolypropylene and a random propylene copolymer for the polypropylene type resin, the compatibility between the component (a) and the component (b) can be increased, to further increase the tensile strength at break and the elongation at break of the thermoplastic elastomer of the present invention. The random propylene copolymer as used herein is a random copolymer of propylene and an α-olefin, which has a polypropylene crystal, and as the α-olefin, ethylene, butene-1, hexene-1 are preferable, particularly ethylene. The content of α-olefin in the copolymer is 1 to 15% by mole, preferably 5 to 15% by mole, and the copolymer has a melting point of 120° to 140° C. and an MFI of at least 0.01. The amount of the random propylene copolymer is not more than 90% by weight based on the weight of the highly crystalline polypropylene type resin as the component (b). If more than 90% by weight, based on the weight of the component (b), of the random propylene copolymer is contained, the heat resistance of the thermoplastic resin is undesirably lowered.

The softening agent is added, if necessary, to improve the fluidity and flexibility of the thermoplastic elastomer of the present invention, and includes paraffin, naphthene, aromatic, and polybutene hydrocarbons. Paraffin, naphthene, and polybutene hydrocarbons are preferable for the present invention. The amount of the softening agent added should be not more than an amount having an equal weight to that of the component (a). If higher than that level, the surface becomes sticky due to a bleeding of the softening agent, and an undesirable lowering of the strength occurs. Also, the addition of this agent can be omitted, as the strength and fluidity can be sufficiently maintained with up to 75 parts by weight of the copolymer rubber.

The thermoplastic elastomer composition of the present invention is obtained by mixing together the respective components of (a) and (b) and a crosslinking agent, and an optional softening agent, and dynamically heat treating the mixture.

For example, there can be employed a method in which the EPR is partially crosslinked and then blended with a polyolefin resin, in Japanese Patent Publication (Kokoku) No. 53-34210, a method in which crosslinking is effected while rubber component and plastic component are mixed together, as disclosed in Japanese Patent Publication (Kokoku) No. 53-21021, and a method in which the rubber component and plastic component are previously thoroughly blended in a kneader, a crosslinking agent added to effect a partial curing, and kneading is then continued, as disclosed in Japanese Unexamined Patent Publication (Kokai) No. 52-37953.

Although a thermoplastic elastomer having a good performance can be obtained by any of the methods described above, from the standpoint of the compatibility of the rubber component and plastic component, preferably the respective components are thoroughly melted and kneaded in the absence of a crosslinking agent, and the melting and kneading continued with the addition of a crosslinking agent. Various crosslinking agents may be used, but crosslinking with an organic peroxide is preferable because desirable properties of the elastomer, such as a compression permanent set, no contamination, and good heat resistance are obtained.

When a dynamic heat treatment is performed by adding an organic peroxide to the respective components of (a) and (b), optionally in the presence of a softening agent, the component (b) is preferably a polypropylene type resin which is not crosslinked, i.e., undergoes molecular cleavage, with an organic peroxide. A polyethylene type resin crosslinked with an organic peroxide cannot be practically employed because an excessive increase of the viscosity occurs. The starting polypropylene type resin to be used in this case should have an MFI of not more than 20. During the dynamic treatment, the starting polypropylene type resin must have a greater molecular weight, to some extent, to compensate for the lower strength caused by a gradual reduction of the molecular weight by molecule cleavage, and the torque during the dynamic treatment must be large, to improve the dispersibility of the rubber component.

Since the inherent tensile strength of the rubber component is great, however, the strength of the thermoplastic elastomer composition is still far superior to that of the thermoplastic elastomer of the prior art, even if the final molecular weight of polypropylene is lowered to an MFI of 100 or more, or even in an extreme case to the extent of losing the ductility, and the fluidity also becomes better in correspondence to the molecule cleavage.

On the other hand, when the curing agent utilizes unsaturated groups such as sulfur vulcanization, the EPDM is crosslinked but the EPM is not crosslinked. Nevertheless, even in this case, by using an EPM with a specific structure as described above, a product with a high strength can be obtained. In this case, however, since the starting polypropylene type resin does not undergo molecular cleavage, it is preferable to employ a starting polypropylene type resin having a larger MFI than that used when an organic peroxide is used as the curing agent. In this case, the MFI is preferably 10 to 60.

Examples of the organic peroxide used include dicumyl peroxide, di-tert-butylperoxide, 2,5-dimethyl-2,5-di-(tert-butylperoxy)hexane, 1,3-bis(tert-butylperoxyisopropyl)benzene, tert-butylcumylperoxide, 2,5-dimethyl-2,5-di-(tert-butylperoxy)hexyne, 3,1-1-di-tert-butylperoxy-3,3,5-trimethylcyclohexane, tert-butylperoxy benzoate, and tert-butylperoxy isopropylcarbonate.

The amount of organic peroxide formulated is 0.1 to 2 parts by weight, preferably 0.5 to 1.0 part by weight, based on 100 parts by weight of the total amount of (a) and (b), and the optional softening agent. If the amount formulated is less than 0.05 part by weight, as a result of a too small a degree of crosslinking of the component (a), the rubbery properties of the thermoplastic elastomer of the present invention, such as heat resistance, compression permanent set, and resilient elasticity become poor. On the other hand, in a formulation of more than 2 parts by weight, due to an excessive molecular cleavage of the component (b), a lowering of the tensile strength at break and elongation at break of the thermoplastic elastomer occur.

As other suitable crosslinking agents, crosslinking agents of the azide type such as formic acid azide and aromatic polyazide, resin vulcanizing agents such as an alkylphenol resin or a brominated alkylphenol resin, and thiuram disulfides such as N,N,N',N'-tetrabutyl-, N,N,N',N'-tetramethyl- and N,N,N',N'-tetralauryl-thiuram disulfides, and further, p-quinonedioxime and sulfur, may be included. When sulfur or a sulfur donor is to be used, a vulcanization accelerator and an activator such as a metal salt or an oxide should be used.

When an organic peroxide is dynamically heat treated, a crosslinking aid can be used. Examples of the crosslinking agent include sulfur, p-quinonedioxime, p,p'-dibenzoylquinonedioxime, ethylene glycol dimethacrylate, 1,3-butylene glycol dimethacrylate, trimethylolpropane trimethacrylate, triallyl cyanurate, triallyl isocyanurate, diallyl phthalate, polyethylene glycol dimethacrylate, 1,2-polybutadiene, N,N'-m-phenylene bismaleimide, maleic anhydride, glycidyl methacrylate. The amount formulated is preferably from equal to to two-fold that of the organic peroxide.

According to the present invention, the rubber component is partially crosslinked under dynamic heat treatment conditions, i.e., a substantially complete crosslinking is not effected. The crosslinking the rubber component in the composition, in addition to imparting a heat resistance and rubber elasticity thereto, substantially improves the tensile strength. But since the copolymer rubber to be used in the present invention has an inherent high strength, the crosslinking density must not be such that it will greatly lower the fluidity, and a particularly high fluidity can be obtained with a high strength in a soft region where the rubber component exceeds 75 parts by weight.

When the degree of crosslinking of the copolymer rubber is too high, i.e., a substantially complete crosslinking is effected, fluidity is lowered and cracks readily appear in the molded product, and further, the elongation at break is disadvantageously lowered. In contrast, at a very low degree of crosslinking, however, the improvement of the tensile strength, particularly the tensile strength at high temperatures, is not always satisfactory.

The degree of partial crosslinking of the rubber component required for the object of the present invention is such that the gel content measured by immersion in cyclohexane at 23° C. for 48 hours is more than 80% and less than 97%, preferably more than 90% and less than 97%, more preferably more than 93% and less than 97%.

The EPM to be used in the present invention has a gel content of at least about 70% in the uncrosslinked state, and it is understood that the above object can be thus accomplished with the use of a relatively smaller amount of organic peroxide.

To measure the gel content of the rubber component in the formulated product crosslinked by the dynamic heat treatment, it is necessary to correct the formulation components other than the rubber component. A suitable method of measuring the gel content in the rubber component of the thermoplastic elastomer obtained by the dynamic heat treatment of a formulated product comprising a rubber component, a resin component, a softening agent, and a crosslinking agent is to first remove the softening agent and the crosslinking agent residue by Soxhlet's boiling point extraction using isopropyl alcohol, and then immerse the residual component in cyclohexane at 23° C. for 48 hours to determine the soluble matter. From among these, soluble matter derived from the resin components are corrected to determine the gel content in the rubber component. The soluble matter in the resin component is determined previously by measurement with the resin alone, but when an organic peroxide is used as the crosslinking agent, the soluble matter varies after the dynamic heat treatment because the polypropylene type resin undergoes molecular cleavage, and in this case, the polypropylene type resin alone is previously caused to undergo molecular cleavage by using an organic peroxide, and a correction is effected by using the relationship between a lowering of the molecular weight at this time and the soluble matter.

In the thermoplastic elastomer of the present invention, inorganic fillers such as talc, carbon black, silica, calcium carbonate, barium sulfate, mica, calcium silicate, etc., can be formulated within the range which does not impair the performance. Further, if necessary, stabilizers such as antioxidants and UV-ray absorbers, etc., and additives such as lubricants, antistatic agents, and flame retardants, etc., can be formulated.

As the melting and kneading device, an open type mixing roll, non-open type Banbury mixer, extruder, kneader, continuous mixer, etc., known in the art, can be used. Among them, preferably the non-open type device is used and kneading is preferably carried out in an inert gas atmosphere such as nitrogen.

The present invention will be described in more detail with reference to the following Examples. The measurement methods used in these Examples are as follows.

(1) MFI: measured according to JIS K7210 at a load of 2.16 kg and 230° C.
(2) HLMFI: measured according to JIS K7210 at a load of 21.6 kg and 230° C.
(3) Tensile strength at break [σ], elongation, and permanent elongation: measured according to JIS K6301
(4) Shore A hardness and Shore D hardness: measured according to ASTM D-2240
(5) Ethylene content in copolymer rubber: measured according to infrared spectroscopy
(6) Intrinsic viscosity [η]: measured in decalin at 135° C.
(7) Melting point [Tm]: measured by DSC 7500 supplied by PERKIN-ELMER, measured at a scanning speed of 20° C./min. in the temperature range of from −20° C. to +200° C.; the sample is a pressed sheet quenched from the melted state at 200° C., and allowed to stand for one day or longer
(8) Crystallinity: measured in conventional manner by an X-ray diffraction device supplied by Rigaku Denki
(9) Gel fraction: determined by immersing sample in cyclohexane at 23° C. for 48 hours, and measuring the amount of insolubles. Namely, the gel fraction is calculated from the weights measured before and after immersion in cyclohexane by detracting the weights of cyclohexane solubles such as a softening agent, plasticizer and soluble resin components, other than the rubber component, from the initial weight.

Preparation of EPM

First, 2.1 kg of anhydrous magnesium chloride (product obtained by drying a commercially available anhydrous magnesium chloride in a dry nitrogen gas stream at about 500° C. for 15 hours) and 0.9 kg of AA type titanium trichloride (manufactured by Toyo Staufer) were co-pulverized in a vibrating ball mill for 8 hours to prepare a uniform co-pulverized product containing 7.2% by weight of titanium atom, 73.7% by weight of chlorine atom, and 17.7% by weight of magnesium atom (hereinafter called "solid component (F)").

Of the thus prepared solid component (F), 600 g was charged into a 100-liter vessel lined with glass, 40 liters of n-hexane were added, and the mixture was stirred to give a uniform suspension. To the suspension was added 100 g of τ-glycidoxypropyltrimethoxysilane, and the mixture was thoroughly stirred at room temperature for one hour. Then the mixture was left to stand, the supernatant was withdrawn, and 20 liters of toluene were added. Subsequently, 2 kg of tetrahydrofuran was added, and the mixture was thoroughly mixed at room temperature for 2 hours. The treatment system was cooled to room temperature, the product was thoroughly washed with n-hexane (until substantially no titanium atom could be recognized in the washing), to give a solid catalyst component (A).

A 290-liter tubular loop type continuous reactor was filled with liquid propylene, and while feeding propylene at a rate of 60 kg/H, maintaining the ethylene concentration in a liquid layer at 10% by mole, and feeding a solution of triethylaluminum in hexane at a rate of 360 milli-mole/H, tetrahydrofuran at a rate of 180 milli-mole/H, and the solid catalyst component (A) at a rate of 3.2 g/H into the reactor, polymerization was carried out at a reaction temperature of 30° C. The polymer was discharged intermittently in the slurry state into a flush hopper, and the polymer taken out from the bottom and dried at 40° C. by passing a warm $N_2$ gas stream thereover, to obtain a dry polymer powder. The powder was in a freely flowing powdery state without mutual sticking, and the yield was 16 kg/H. The average polymerization activity per solid catalyst was found to be 49.3 kg/g-Ti.

To 100 parts by weight of the powder were added 0.05 part by weight of 2,6-di-t-butyl-p-cresol, 0.2 part by weight of dimyristyl thiodipropionate, 0.05 part by weight of tetrakis-[methylene-3-(3′,5′-di-t-butyl-4′-hydroxyphenyl)propionate]methane and 0.2 part by weight of calcium stearate, and the mixture was masticated by 3 inch rolls at 180° C. for 5 minutes. The sheet sample obtained was compression molded, and the tensile strength and shore hardness were measured. This product had an ethylene content of 67% by mole, an MFI of 0.0075, an HLMFI of 0.3 g/10 min., an HLMFI/MFI of 40, an Mw/Mn of 5.3, and a crystallinity 7.0% as measured by the X-ray diffractometry, a melting point (by DSC) of 110° C., and an intrinsic viscosity of 5.9 dl/g as measured in decalin at 135° C. This sample is called EPM-1.

Using the same catalyst and reactor, various samples EPM-2 to EPM-4 were prepared by varying the reaction conditions. Also, as an example with a narrow molecular weight distribution (small HLMFI/MFI), a commercially available EPM-5 was employed. The properties of these EPM's are shown in Table 1.

On the other hand, a commercially available EPDM having a Mooney viscosity of 65 and an iodine value of 24, and prepared by using ethylidene norbornene as the third component, was used. The properties of this EPDM are also shown in Table 1.

TABLE 1

| Rubber Component | Ethylene content (mole %) | MFI (g/10 min) | HLMFI (g/10 min) | HLMFI/MFI | [η] (dl/g) | Mw/Mn | Tm (°C.) | Crystallinity (%) | σ (kg/cm²) | Share A hardness |
|---|---|---|---|---|---|---|---|---|---|---|
| EPM-1 | 67 | 0.0075 | 0.3 | 40 | 5.9 | 5.3 | 110 | 7.0 | 200 | 70 |
| EPM-2 | 58 | 1.5 | 67.5 | 45 | 1.9 | 5.5 | — | 0 | Not more than 20 | Not more than 50 |
| EPM-3 | 85 | 0.01 | 0.45 | 45 | 5.5 | 5.5 | 118 | 25 | 280 | 95 |
| EPM-4 | 67 | 1.0 | 40.0 | 40 | 2.1 | 5.2 | 110 | 7.0 | 70 | 68 |
| EPM-5 | 75 | 0.7 | 14 | 20 | 2.2 | 2.3 | 50 | 12 | 65 | 70 |
| EPDM | 52 | 0.3 | 9.0 | 30 | 3.1 | 3.5 | — | 0 | Not more | Not more |

TABLE 1-continued

| Rubber Component | Ethylene content (mole %) | MFI (g/10 min) | HLMFI (g/10 min) | HLMFI/MFI | [η] (dl/g) | Mw/Mn | Tm (°C.) | Crystallinity (%) | σ (kg/cm$^2$) | Share A hardness |
|---|---|---|---|---|---|---|---|---|---|---|
| | | | | | | | | | than 30 | than 50 |

Preparation of Composition

After the respective components except for the crosslinking agent were uniformly dispersed by a Laboplastomill, Banbury mixer having a capacity of 75 cc supplied by Toyo Seiki, at 185° C. and at a rotor rotation of 60 rpm for 5 minutes, the crosslinking agent and the crosslinking aid were added. The melting and kneading were further continued for 10 minutes, and the sample was then taken out and hot pressed at 230° C. to prepare respective test strips.

di(t-butylperoxy)-hexane, supplied by Kayaku Nooley) was employed, and as the crosslinking aid, triallyl isocyanurate (TAIC) was employed.

As the softening agent, Sunpar 150 (paraffin oil, supplied by Sunoil) was employed.

EXAMPLES 1–7, COMPARATIVE EXAMPLES 1–8

Using the starting materials as described above, various compositions were prepared by the method as described above, to obtain the results shown below in Table 2.

TABLE 2

| | Examples | | | | | | |
|---|---|---|---|---|---|---|---|
| | 1 | 2 | 3 | 4 | 5 | 6 | 7 |
| EPM-1 (Parts) | 40 | 40 | 30 | 60 | 40 | 60 | 75 |
| EPM-2 (Parts) | | | | | | | |
| EPM-3 (Parts) | | | | | | | |
| EPM-4 (Parts) | | | | | | | |
| EPM-5 (Parts) | | | | | | | |
| EPDM (Parts) | 20 | 20 | 30 | | 20 | | |
| PP (Parts) | 40 | 40 | 40 | 40 | 40 | 30 | 25 |
| RPP (Parts) | | | | | | 10 | |
| Softening agent | 20 | | | | 20 | | |
| Crosslinking agent | 0.5 | 0.5 | 0.5 | 0.5 | 0.2 | 0.5 | 0.3 |
| Aid | 1.0 | 1.0 | 1.0 | 1.0 | 0.5 | 1.0 | 0.6 |
| MFI (g/10min, 230° C.) | 0.1 | 0.06 | 0.01 | 0.08 | 0.3 | 0.1 | — |
| HLMFI (g/10min, 230° C.) | 500 | 220 | 200 | 400 | 320 | 490 | 95 |
| Tensile strength at break (kg/cm$^2$) | 150 | 175 | 160 | 210 | 90 | 230 | 135 |
| Tensile elongation at break (%) | 480 | 480 | 460 | 400 | 380 | 550 | 330 |
| Permanent elongation (%) | 26 | 27 | 23 | 35 | 30 | 26 | 24 |
| Shore A/D | 86/34 | 90/40 | 90/40 | —/47 | 84/32 | 93/41 | 82/30 |
| Gel fraction (%) | 93 | 94 | 95 | 94 | 85 | 94 | 93 |

| | Comparative Examples | | | | | | | |
|---|---|---|---|---|---|---|---|---|
| | 1 | 2 | 3 | 4 | 5 | 6 | 7 | 8 |
| EPM-1 (Parts) | 40 | | 40 | 60 | | | | |
| EPM-2 (Parts) | | | | | | | | 60 |
| EPM-3 (Parts) | | | | | 60 | | | |
| EPM-4 (Parts) | | | | | | | 60 | |
| EPM-5 (Parts) | | | | | | 60 | | |
| EPDM (Parts) | 20 | 60 | 20 | | | | | |
| PP (Parts) | 40 | 40 | 40 | 40 | 40 | 40 | 40 | 40 |
| RPP (Parts) | | | | | | | | |
| Softening agent | 20 | | | 80 | | | | |
| Crosslinking agent | 0.05 | 0.5 | 2.5 | 0.5 | 0.5 | 0.5 | 0.5 | 0.5 |
| Aid | 0.1 | 1.0 | 3.0 | 1.0 | 1.0 | 1.0 | 1.0 | 1.0 |
| MFI (g/10min, 230° C.) | 0.5 | — | 0.01 | 1.0 | 0.03 | — | 0.6 | 2.5 |
| HLMFI (g/10min, 230° C.) | 600 | 6.0 | 50 | 2000 | 420 | 80 | 180 | 570 |
| Tensile strength at break (kg/cm$^2$) | 60 | 166 | 80 | 60 | 50 | 60 | 80 | 35 |
| Tensile elongation at break (%) | 250 | 470 | 150 | 400 | 150 | 300 | 340 | 180 |
| Permanent elongation (%) | 40 | 20 | — | 30 | 60 | 39 | 40 | 39 |
| Shore A/D | 85/33 | 91/42 | —/45 | 64/15 | —/53 | —/46 | —/45 | 87/33 |
| Gel fraction (%) | 75 | 93 | 99 | 90 | 95 | 85 | 83 | 55 |

Other Starting Materials

In Examples and Comparative examples, as the polypropylene type resin, a polypropylene (PP) having an MFI of 0.5 g/10 min. and a melting point of 160° C. and a random propylene copolymer (RPP) having an MFI of 0.08 g/10 min., an ethylene content of 8.8% by mole and a melting point of 130° C. were employed. As the crosslinking agent, Kayahexa AD (2,5-dimethyl-2,5-

As shown in Examples 1, 2, 3 and 5, when EPDM is incorporated in the rubber component, the flexibility is enhanced and the permanent elongation is improved, compared with Example 4 wherein EPDM is not incorporated in the rubber component. In other words, as shown in Example 4, when the rubber component is comprised only of EPM, the tensile strength and fluidity are satisfactory, but the flexibility and permanent elongation are somewhat poor. In Example 1 wherein the amount of the crosslinking agent is salient and thus the gel fraction is increased, the tensile strength and elongation at break are enhanced compared with Example 5.

On the other hand, when the rubber component is only EPDM, the fluidity is greatly lowered, to worsen the balance between the strength and fluidity (Comparative example 2).

When a softening agent is not added, the strength is improved, but the fluidity is lowered. In Comparative example 4, in which a softening agent is added in an amount (80 parts) exceeding the amount of the rubber component, the fluidity and flexibility are improved, but the strength is greatly lowered, whereby the surface becomes sticky.

On the other hand, in the case of Comparative example 1, in which the gel content in the rubber component is lowered to 75% by reducing the amount of the crosslinking agent formulated, the lowering of the strength is marked compared with Example 2, and in the case of a gel content of 99%, namely when crosslinking is effected (Comparative example 3), it is seen that the fluidity is inferior and the elongation is remarkably lowered.

In Comparative example 5, in which EPM-3 with a higher ethylene content is used, the composition becomes hard, and the compatibility with PP is poor, and thus the strength and elongation at break are poor. On the other hand, when EPM-5 with a small Mw/Mn is used, the fluidity is poor (Comparative example 6). The strength at break in Comparative example 7 using EPM-4 with a large MFI, and further, in Comparative Example 8 using EPM-2 with a large propylene content and a low strength at break, is markedly smaller compared with that in Example 4 with a similar formulation and composition.

On the other hand, when homo-polypropylene and a random propylene copolymer are used in combination for PP (Example 6), the elongation is markedly improved, to thereby increase the strength.

The elastomer in Example 7 contains 75 parts of EPM-1, but still maintains a good fluidity.

EXAMPLE 8

With 100 parts by weight of the copolymer rubber components of 24 parts of EPM-1, 36 parts of EPDM, and 40 parts of a polypropylene having an MFI of 20 g/10 min. and a melting point of 160° C., 5 parts by weight of zinc oxide, 1.5 parts by weight of tetramethylthiuram disulfide, 0.5 parts by weight of mercaptobenzothiazole, 1 part by weight of stearic acid and 1.5 part by weight of sulfur were mixed together, and the mixture was melted and kneaded as described in the foregoing Examples, to crosslink only the EPDM portion, followed by hot pressing at 230° C., to prepare test specimens.

The MFI of the composition obtained was not measurable, and an elastomer with an HLMFI of 200, a tensile strength at break of 120 kg/cm$^2$, a tensile elongation at break of 500%, a permanent elongation of 25%, Shore A and D hardnesses of 80 and 30, respectively, and a gel fraction of 94, was obtained.

In the thermoplastic elastomer of the present invention, the rubber component used comprises an ethylene-propylene copolymer rubber with high melting polyethylene crystals and having a broad molecular weight distribution and a great green strength, and optionally, an ethylene-propylene-nonconjugated diene copolymer having an excellent flexibility, and has been subjected to partial crosslinking with the use of a suitable crosslinking agent. Therefore, the thermoplastic elastomer has higher fluidity and higher strength than the thermoplastic elastomers known in the art, and an excellent flexibility and rubbery properties.

The elastomer of the present invention has an excellently balanced flexibility, rubbery properties, and strength and a good fluidity, and thus is suitable for automobile parts, such as bumpers, corner bumpers, side panels, spoilers, etc., hoses, various packings, insulating sheets and other electrical parts, wire cables, such as flexible cords, booster cables, etc., and civil engineering and construction materials, such as water-proof sheets and cut-off materials, and these parts can be easily molded by a conventional molding method such as blow molding, extrusion molding, and injection molding.

We claim:

1. A thermoplastic elastomer which is a cured product prepared by treating a composition comprising (a) 45 to 90 parts by weight of a rubbery component and (b) 10 to 55 parts by weight of a polyolefin resin, based on 100 parts by weight of the sum of the components (a) and (b), with a curing agent; said rubbery component (a) comprising, based on the weight of the rubbery component, 5 to 100% by weight of an ethylene-propylene copolymer rubber having an ethylene content of 60 to 78% by mole, a crystallinity of 4 to 20% as determined by the X-ray diffractometry, a maximum peak temperature of melting of at least 100° C., a melt flow index (MFI) at 230° C. of less than 0.01, a high-load melt flow index (HLMFI)/melt flow index (MFI) ratio of at least 35, a weight average molecular weight (Mw)/number average molecular weight (Mn) ratio of at least 4, and a tensile strength at break of at least 100 kg/cm$^2$, and 95 to 0% by weight of an ethylene-propylene-nonconjugated diene copolymer; and said rubbery component (a) in the cured product having a gel content of more than 80% by weight and less than 97% by weight as determined by immersion in cyclohexane at 23° C. for 48 hours.

2. The thermoplastic elastomer according to claim 1, wherein the ethylene-propylene copolymer rubber has a crystallinity of 4 to 10%, an Mw/Mn of at least 5, and a tensile strength at break of at least 150 kg/cm$^2$.

3. The thermoplastic elastomer according to claim 1, wherein the ethylene-propylene copolymer rubber has a Shore A hardness of 50 to 95.

4. The thermoplastic elastomer according to claim 1, wherein the ethylene-propylene-nonconjugated diene copolymer comprises units derived from ethylene and units derived from propylene in a proportion (ethylene units/propylene units) of 60/40 to 78/22, and 1 to 15% by weight, based on the weight of the ethylene-propylene-nonconjugated diene copolymer, of a nonconjugated diene compound having 5 to 20 carbon atoms, and has an intrinsic viscosity [η] of 0.5 to 4 dl/g as measured in decaline at 135° C.

5. The thermoplastic elastomer according to claim 1, wherein the rubbery component (a) comprises 25 to 75% by weight of the ethylene-propylene copolymer rubber and 75 to 25% by weight the ethylene-propylene-nonconjugated diene copolymer.

6. The thermoplastic elastomer according to claim 1, wherein the polyolefin resin of the component (b) is a polypropylene type resin.

7. The thermoplastic elastomer according to claim 6, wherein the polypropylene type resin of the component (b) is a mixture of 10 to 100% by weight of a homopolypropylene and 90 to 0% by weight of a propylene-α-olefin random copolymer containing 5 to 15% by mole of an α-olefin.

8. The thermoplastic elastomer according to claim 1, wherein said composition further comprises a softening agent in an amount not more than an amount having an equal weight to that of the rubbery component (a).

9. The thermoplastic elastomer according to claim 1, wherein the curing agent is an organic peroxide, and the treatment is effected dynamically.

* * * * *